United States Patent [19]
Singerman

[11] 3,890,340
[45] June 17, 1975

[54] PREPARATION OF 2,1-BENZISOTHIAZOLES

[75] Inventor: Gary M. Singerman, Prairie Village, Kans.

[73] Assignee: Gulf Research & Development Company, Pittsburgh, Pa.

[22] Filed: Dec. 19, 1973

[21] Appl. No.: 426,064

[52] U.S. Cl. ............ 260/304; 260/556 A; 260/578; 424/270
[51] Int. Cl. ............................................. C07d 91/12
[58] Field of Search ..................................... 260/304

[56] References Cited
UNITED STATES PATENTS
3,187,001   6/1965   Meyer et al. ..................... 260/304

Primary Examiner—R. Gallagher

[57] ABSTRACT

2,1-Benzisothiazoles are prepared by reacting a 2-alkylaniline or a 2-alkyl-N-sulfinylaniline with a sulfinylsulfonamide. The reaction can be effected by thermal means, with or without a solvent, or in the presence of a tertiary amine catalyst. Solid 5-methoxy-2,1-benzisothiazole is produced by the reaction of N-sulfinylmethanesulfonamide with 4-methoxy-2-methyl-N-sulfinylaniline.

13 Claims, No Drawings

PREPARATION OF 2,1-BENZISOTHIAZOLES

SUMMARY OF THE INVENTION

The present invention relates to a novel process for the preparation of 2,1-benzisothiazoles having the formula I

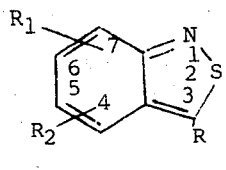

wherein R, $R_1$ and $R_2$ are independently hydrogen, cycloalkyl, alkyl, aryl, or heteroaryl, the latter four being optionally substituted with halogen, cyano, nitro, alkoxy, acyl, acyloxy, carboalkoxy, carboaryloxy, aryl, heteroaryl, alkylthio, arylthio, dialkylamino, diarylamino, arylalkylamino, acylalkylamino, acylarylamimo, dialkylcarbamoyl, diarylcarbamoyl or arylalkylcarbamoyl; and $R_1$ and $R_2$ additionally are independently halogen, cyano, nitro, alkoxy, aryloxy, carboalkoxy, carboaryloxy, acyl, acyloxy, alkylthio, arylthio, dialkylamino, diarylamino, arylalkylamino, acylalkylamino, acylarylamino, dialkylcarbamoyl, diarylcarbamoyl, or arylalkylcarbamoyl, or together with the two adjacent carbon atoms of the benzene ring represent a second benzene ring which can optionally be substituted by halogen, cyano, nitro, alkoxy, aryloxy, carboalkoxy, carboaryloxy, acyl, acyloxy, alkylthio, arylthio, dialkylamino, diarylamino, arylalkylamino, acylalkylamino, acylarylamino, dialkylcarbamoyl, diarylcarbamoyl, or arylalkylcarbamoyl.

Cycloalkyl means cyclic alkyl groups of four to eight carbon atoms, preferably five or six carbon atoms and includes cycloalkyl substituted with one or two lower alkyl groups. Alkyl means aliphatic hydrocarbon groups, straight or branched chain, having one to 30 carbon atoms, preferably one to eight carbon atoms and most preferably one to four carbon atoms, including alkyl substituted with aryl, halogen and the like, and includes methyl, ethyl, propyl, n-butyl, octyl, dodecyl, eicosyl, triacontyl, benzyl, chloromethyl, and the like. Aryl means monovalent, mononuclear or dinuclear aromatic groups of six to 12 carbon atoms, including aryl substituted with lower alkyl, halogen, and the like and includes phenyl, naphthyl, tolyl, xylyl, chlorophenyl, and the like. Heteroaryl means monovalent sulfur- or nitro-containing mononuclear or dinuclear aromatic groups of four to 12 carbon atoms and one to four sulfur or nitrogen atoms in the ring structure including heteroaryl substituted with lower alkyl, halogen, and the like, such as thiophene, pyridine, pyridazine, quinoline, and the like. Halogen means fluorine, chlorine, bromine and iodine. Alkoxy, carboalkoxy, alkylthio, dialkylamino, and dialkylcarbamoyl mean groups in which the alkyl portion is defined above. Aryloxy, carboaryloxy, arylthio, diarylamino and diarylcarbamyl mean groups in which the aryl portion is defined above. Arylalkylamino and arylalkylcarbamoyl mean groups in which the alkyl and aryl portions are defined above. Acyl, acyloxy, acylalkylamino and acylarylamino mean groups having alkyl and/or aryl portions as defined above.

Heretofore, no mention has been made of the ability of a sulfinylsulfonamide to react with a methyl group, or other alkyl group, attached to an aromatic ring, except when the methyl group is substituted with a phenacyl group, as in deoxybenzoin ($C_6H_5CO-CH_2-C_6H_5$). In this case, interaction of deoxybenzoin or a substituted deoxybenzoin with a sulfinylsulfonamide in the presence of aluminum chloride yields thiiranes or tetrasubstituted ethylenes, but not 2,1-benzisothiazoles (G. Kresze, et al, Angew. Chem. Internat. Edit., 6 (2), 149 (1967)).

It is therefore surprising that in the process according to the present invention, 2,1-benzisothiazoles of formula I are obtained in a simple manner and in good yields by reacting a 2-alkylaniline or a 2-alkyl-N-sulfinylaniline of the general formula II

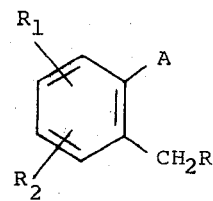

with a sulfinylsulfonamide of the general formula III
$R_3SO_2NSO$
in which A is amino or N-sulfinylamino (-NSO); R, $R_1$, and $R_2$ are as defined above, and $R_3$ is alkyl as defined above, optionally substituted with halogen, or aryl as defined above, optionally substituted with halogen, alkyl as defined above, or nitro groups. Preferably, $R_3$ is methyl, phenyl, or tolyl. R, $R_1$, $R_2$ and $R_3$ as defined above do not contain acidic hydrogen atoms capable of reacting under the reaction conditions of the present invention with the sulfinylsulfonamide (III), and therefore R, $R_1$, $R_2$ and $R_3$ are not, or do not contain primary or secondary amines, a carboxylic acid group (—COOH), a hydroxyl group (—OH), a secondary carbamoyl group (—CONHR) or a thiol group (—SH). $R_1$ and $R_2$, however, can be or can contain a primary carbamoyl group (—CONH$_2$), but in this case, the sulfinylsulfonamide (III) will dehydrate the primary carbamoyl group to a cyano group (—CN) simultaneously with the cyclization reaction so that a cyano-substituted 2,1-benzisthiazole will be produced instead of a carbamoyl-substituted 2,1-benzisothiazole.

The reaction according to the present invention can be carried out thermally or in the presence of a tertiary amine catalyst. In either case an inert solvent can optionally be used. The tertiary amine catalyst can serve as the solvent. If the reaction is carried out thermally without added catalyst, one equivalent of a 2-alkyl-N-sulfinylaniline or one equivalent of 2-alkylaniline selected from formula II is mixed with one to five equivalents or two to five equivalents, respectively, of a sulfinylsulfonamide selected from formula III, and optionally with an inert solvent having a boiling point at atmospheric pressure of at least 120°C. The mixture is heated in a temperature range of 120° to 180°C. in a time interval of 15 minutes to 100 hours. Below 120° the reaction is very slow; above 180°, extensive decomposition occurs. Examples of inert solvents which can be employed according to the present invention include aliphatic hydrocarbons having a boiling point from about 50° to 200°C. optionally substituted with halogen, phenyl, or alkoxy groups, such as 1,2-dipropoxyethane, and mononuclear or dinuclear aromatic hydrocarbons optionally substituted with halogen, lower alkyl, or nitro groups such as xylene or nitrobenzene. Advantageously, the reaction can be carried out in the presence of a tertiary amine catalyst, in which case the temperature required to obtain a reasonable reaction rate is markedly lowered, while decomposition reactions and other undesirable side reactions are reduced. When a tertiary amine catalyst is employed, inert solvents as described hereinabove can have boiling points at atmospheric pressure as low as 50° C. Benzene and tetrahydrofuran are examples of such useful, inert solvents. The tertiary amine catalyst itself can also be used as the sole solvent.

In a typical reaction, one equivalent of a 2-alkyl-N-sulfinylaniline or one equivalent of a 2-alkylaniline selected from formula II is admixed with one to four equivalents or two to four equivalents, respectively, of a sulfinylsulfonamide selected from formula III, 0.5 to 4 equivalents of tertiary amine catalyst, an inert solvent, and the mixture is heated in the temperature range of 50° to 150° C., preferably at 60° to 90° C., for a period of time ranging from 15 minutes to 100 hours or more. If desired, one can use more than four equivalents of sulfinylsulfonamide for each equivalent of 2-alkylaniline or 2-alkyl-N-sulfinylaniline, but this is usually of little advantage and is economically wasteful. In another typical example, one equivalent of a 2-alkyl-N-sulfinylaniline or one equivalent of a 2-alkylaniline selected from formula II is admixed with one to four equivalents or two to four equivalents, respectively, of a sulfinylsulfonamide selected from formula III and a sufficient quantity of a liquid tertiary amine having a boiling point at atmospheric pressure of 50° to 150° C. to act as both solvent and catalyst. The mixture is then heated in the temperature range of 50° to 150° C. for a period of time ranging from 15 minutes to 100 or more hours.

Tertiary amines which can be used advantageously in the reaction according to the present invention can be nitrogen-containing heteroaryl aromatic compounds such as pyridine, pyrazine, or quinoline; trialkyl tertiary amines wherein the term "alkyl" is described hereinabove; or aryldialkylamines wherein the terms "aryl" and alkyl are described hereinabove. The alkyl and aryl groups of the tertiary amines can optionally be substituted with halogen, nitro, or alkoxy groups, but should not be substituted with groups having acidic hydrogen atoms capable of reacting under the reaction conditions of the present invention with the sulfinylsulfonamide (III), specifically primary and secondary amines, a carboxylic acid group (—COOH), a hydroxyl group (—OH), a primary carbamoyl group (—CONH$_2$), a secondary carbamoyl) group (—CONHR), or a thiol group (—SH). Representative examples of trialkylamines and aryldialkylamines which can be used according to the present invention, are triethylamine, N-methylmorpholine, triethylenediamine, N,N-dimethylaniline, N-methylpyrrolidine, and the like. A preferred tertiary amine catalyst is pyridine.

The mechanism of the process as described herein to product 2,1-benzisothiazoles is unclear. The sulfinylsulfonamide (III) may be, but is not necessarily, the chemical species which converts the 2-alkyl-N-sulfinylaniline (II) or 2-alkylaniline (II) to a 2,1-benzisothiazole (I). Under the influence of heat or a tertiary amine catalyst, the sulfinylsulfonamide may be converted first into another species, such as a disulfonylsulfodiimide (RSO$_2$N=S=NSO$_2$R), which may then interact with the 2-alkyl-N-sulfinylaniline or 2-alkylaniline to produce the 2,1-benzisothiazole. This is suggested only as a possibility, since no mention has been made that disulfonylsulfodiimide, such as dimethanesulfonylsulfodiimide or diphenylsulfonylsulfodiimide, will react in any way with the 2-alkyl-N-sulfinylanilines or the alkyl group of the 2-alkylanilines described herein.

Compounds produced in accordance with the present invention are effective in inhibiting the growth of and in killing bacteria and fungi, including those pathogenic to humans, e.g., *Staphylococcus aureus* and *Escherichia coli*, and those of agricultural importance, including citrus post-harvest decay organisms such as *Penicillium digitatum* and *Penicillium italicum*. Compounds produced in accordance with the present invention are also useful as intermediates for the preparation of antifungal agents. One such compound which is particularly effective for controlling post-harvest decay organisms such as *P. digitatum* and *P. italicum* is 5-chloro-4-nitro-2,1-benzisothiazole, which can be prepared from 5-chloro-2,1-benzisothiazole. The process of the present invention is further useful since it provides intermediates for the preparation of insecticides. 4-Hydroxy-2,1-benzisothiazole can be converted to the insecticidal agent 2,1-benzisothiazol-4-yl N-methylcarbamate.

DETAILED DESCRIPTION OF THE INVENTION

The invention is further illustrated, without limitation, by the examples set forth below as to reaction procedures and methods of testing. Temperature is given in centigrade degrees; all nuclear magnetic resonance (nmr) spectra were recorded in deuteriochloroform solution in parts per million ($\delta$) relative to the internal reference standard tetramethylsilane, unless otherwise stated.

EXAMPLE 1

Preparation of 2,1-benzisothiazole:

A. To a solution of 10.7 g. (0.0699 mole) 2-methyl-N-sulfinylaniline and 30 ml. dry benzene in a 250 ml. single-neck round-bottom flask was added at room temperature a solution of 22.4 g. (0.11 mole) N-sulfinylbenzenesulfonamide and 30 ml. dry benzene. The mixture was chilled in an ice bath and to it was added portionwise with swirling a solution of 7.9 g. (0.1 mole) dry pyridine and 20 ml. dry benzene. After completion of addition, the mixture was removed from the ice bath and heated at reflux temperature under a condenser fitted with a calcium sulfate drying tube for 16 hours. Benzene and pyridine were then removed from the reaction mixture by evaporation on a rotatory evaporator at 15–20 mm. Hg. The residue was chilled in an ice bath and to it was added 35 ml. water. After standing for 10 minutes at room temperature with occasional swirling, the mixture was extracted with chloroform. The chloroform extract was dried over calcium sulfate. The calcium sulfate was removed by filtration, and chloroform was removed from the filtrate by evaporation on a rotary evaporator. The tarry residue was extracted with ether, insoluble materials being discarded. The ether was evaporated from the ethereal extract and the residue was extracted with boiling hexane. The hexane extract was clarified by filtration and hexane was evaporated from the filtrate. To the oily residue was added 15 ml. water and sufficient 50 percent aqueous hydrochloric acid so that the resultant mixture had a pH of about 4. The aqueous acidic mixture was extracted with chloroform. The chloroform extract was dried, filtered, and evaporated as before to give an oily residue. This was distilled to give 3.1 g. (32.8 percent) of pure 2,1-benzisothiazole as a light yellow oil, bp. 60° at 0.6 mm. Hg. This structure was confirmed by its nmr spectrum which showed a singlet absorption at 9.07 ppm. for the proton attached to the 3-position of the 2,1-benzisothiazole ring, and a complex multiplet absorption spread between 6.95 and 7.97 ppm. for the benzenoid protons.

Analysis. - Calcd. for $C_7H_5NS$ (percent): C, 62.19; H, 3.73; N, 10.36; S, 23.72. Found (percent): C, 62.39; H, 3.70; N, 10.56: S, 23.51.

B. A solution of 15.3 g. (0.1 mole) 2-methyl-N-sulfinylaniline and 80 ml. dry pyridine in a single-neck round-bottom flask was chilled in an ice bath and to it was added 22.4 g. (0.11 mole) N-sulfinylbenzenesulfonamide. The mixture was heated at reflux temperature for six hours under a condenser fitted with a calcium sulfate drying tube. Pyridine was removed from the reaction mixture by evaporation on a rotatory evaporator and 35 ml. water was added to the residue. After standing five minutes at room temperature, the mixture was extracted with chloroform. The chloroform extract was dried over calcium sulfate. Calcium sulfate was removed by filtration and chloroform was evaporated from the filtrate to give a residue which was shown by nmr to be product contaminated with starting materials. Water (35 ml.) was added to the residue and the mixture was acidified with 50 percent aqueous hydrochloric acid to pH 4. The acidic mixture was extracted with chloroform. The chloroform extract was dried, filtered, and evaporated as before to give an oily residue. This was distilled in vacuo as in part A to give 7.1 g. (52.6 percent) of pure 2,1-benzisothiazole.

C. To a solution of 10.7 g. (0.0699 mole) 2-methyl-N-sulfinylaniline and 30 ml. dry benzene in a 250 ml. single-neck round-bottom flask was added at room temperature a solution of 15.5 g. (0.11 mole) N-sulfinylmethanesulfonamide and 30 ml. dry benzene. The mixture was chilled in an ice bath and to it was added a solution of 7.9 g. (0.10 mole) dry pyridine and 20 ml. dry benzene. A white solid precipitated from the reaction mixture. After the reaction exotherm was dissipated in the ice bath, the mixture was heated at reflux temperature for 18 hours under a condenser fitted with a calcium sulfate drying tube. The white solid dissolved approximately 20 minutes after reflux temperature was reached. After completion of the reflux period, benzene and pyridine were removed from the reaction mixture by evaporation on a rotatory evaporator at 15 to 20 mm. Hg. The residue was chilled in an ice bath and to it was added 35 ml. water. The mixture was allowed to stand at room temperature for 10 minutes with occasional swirling and was extracted with chloroform. The chloroform extract was dried over calcium sulfate. Calcium sulfate was removed by filtration and chloroform was removed from the filtrate by evaporation on a rotatory evaporator. The dark, oily residue was distilled to give 6.0 g. of a yellow oil, boiling range 50°–60° at 0.4 mm. Hg. The nmr spectrum of the distillate showed it to be principally 2,1-benzisothiazole containing small amounts of 2-methyl-N-sulfinylaniline and o-toluidine. Water (20 ml.) was added to the distillate and the mixture was acidified to pH 4 with 50 percent aqueous hydrochloric acid. The acidic mixture was extracted with chloroform. The chloroform extract was dried, filtered, and evaporated as before, and the residue was distilled in vacuo as in part A to give 5.7 g. (60.4 percent) of pure 2,1-benzisothiazole as a light yellow oil. The structure was confirmed by nmr.

D. The experiment of part C was repeated exactly, except dry tetrahydrofuran was used in place of benzene, to give 1.1 g. of 2,1-benzisothiazole.

E. A solution of 14.1 g. (0.1 mole) N-sulfinylmethanesulfonamide and 50 ml. dry benzene was thoroughly chilled in an ice bath. To it was added portionwise with swirling, a solution of 7.9 g. (0.1 mole) dry pyridine and 20 ml. dry benzene. A white crystalline complex of pyridine and N-sulfinylmethanesulfonamide precipitated. The mixture was removed from the ice bath, stoppered, and allowed to stand at room temperature overnight. The complex was isolated by suction filtration under nitrogen in a dry box and washed with benzene. While still in the dry box and under nitrogen, 15 g. (0.068 mole) of the complex was added to 80 ml. dry benzene. To this was added 6.12 g. (0.04 mole) 2-methyl-N-sulfinylaniline. The mixture was removed from the dry box, then stirred magnetically and heated at reflux temperature for 69 hours under a condenser fitted with a calcium sulfate drying tube. Benzene was then removed from the mixture by evaporation on a rotatory evaporator. Water (100 ml.) was added to the residue and the mixture was allowed to stand at room temperature 30 minutes with occasional swirling, then heated on a steam bath 10 minutes with swirling. After cooling, the mixture was extracted with chloroform. The chloroform extract was washed once with water and dried over calcium sulfate. Calcium sulfate was removed by filtration and chloroform was removed from the filtrate by evaporation on a rotatory evaporator. The nmr spectrum of the dark, oily residue showed it to be essentially pure 2,1-benzisothiazole. This was distilled in vacuo to give 3.4 g. (63 percent) of pure 2,1-benzisothiazole as a light yellow oil, bp. 55° at F. A mixture of 9.2 g. (0.06 mole) 2-methyl-N-sulfinylaniline, 11.3 g. (0.08 mole) N-sulfinylmethanesulfonamide, 11.3 g. (0.08 mole) N-sulfinylmethanesulfonamide and 40 ml. dry xylene was heated at reflux temperature 10 hours. After cooling to room temperature, xylene was decanted from a solid material. The solid was washed with benzene and the benzene extract combined with the xylene. The combined benzenexylene phase was washed once with water and dried over calcium sulfate. Calcium sulfate was removed by filtration and solvent was removed from the filtrate by evaporation on a rotatory evaporator to give a dark, oily residue, shown by nmr to be a mixture of 2-methyl-N-sulfinylaniline and 2,1-benzisothiazole. To remove 2-methyl-N-sulfinylaniline, the mixture was treated with 15 ml. concentrated hydrochloric acid and allowed to stand at room temperature 30 minutes with occasional swirling. The mixture was diluted with 100 ml. water and extracted with chloroform. The chloroform extract was washed once with water and dried over calcium sulfate, then filtered and evaporated as before to give an oily residue. This was distilled to give a low yield of pure 2,1-benzisothiazole as a light yellow oil, bp. 66° at 0.5 mm. Hg. This structure was confirmed by nmr.

G. A mixture of 9.0 g. (0.06 mole) 2-methyl-N-sulfinylaniline and 15.6 g. (0.11 mole) N-sulfinylmethanesulfonamide in a round-bottom flask fitted with reflux condenser was heated in an oil bath at 140°–150° for 2.5 hours. After cooling to room temperature, 40 ml. water was added cautiously to the reaction mixture, after which 15 ml. concentrated hydrochloric acid was added. After standing five minutes at room temperature, the mixture was extracted with chloroform. The chloroform extract was washed once with water and dried over calcium sulfate. Calcium sulfate was removed by filtration and chloroform was removed from the filtrate by evaporation on a rotatory evaporator. The residue was distilled to give 0.5 g. pure 2,1-benzisothiazole, bp. 66° at 0.5 mm. Hg. This structure was confirmed by nmr.

H. A mixture of 15 g. (0.098 mole) 2-methyl-N-sulfinylaniline, 40 g. (0.184 mole) N-sulfinyl-p-toluenesulfonamide, and 70 ml. dry xylene was heated at reflux temperature for 2.5 hours. After cooling, xylene was removed by evaporation on a rotatory evaporator and replaced with water. Solid p-toluenesulfonamide precipitated. The water was decanted and extracted with benzene. The solid was also extracted with benzene, and the combined benzene extracts were dried over calcium sulfate. Calcium sulfate was removed by filtration and the filtrate was stripped of benzene by evaporation on a rotatory evaporator. The residue was distilled to give a mixture in low yield of 2-methyl-N-sulfinylaniline and 2,1-benzisothiazole, bp. 60°–65° at 0.5 mm. Hg.

I. The experiment of Part C was repeated exactly, except 10.1 g. (0.10 mole) N-methylmorpholine was used in place of pyridine and the crude reaction product obtained from the chloroform extract was not distilled. A low yield of 2,1-benzisothiazole was identified in the crude product mixture by nmr.

J. A solution of 10.7 g. (0.1 mole) o-toluidine and 25 ml. dry benzene in a single-neck round-bottom flask was chilled in an ice bath while to it was added a solution of 29.6 g. (0.21 mole) N-sulfinylmethanesulfonamide and 25 ml. dry benzene. While still in the ice bath, 7.9 g. (0.1 mole) dry pyridine was added to the mixture. A white solid precipitated. The reaction mixture was then heated at reflux temperature 16 hours under a condenser fitted with a calcium sulfate drying tube. The white solid dissolved during the first 20 minutes of refluxing. After completion of the reflux period, benzene and pyridine were removed from the reaction mixture by evaporation on a rotatory evaporator at 15–20 mm. Hg. and 50 ml. water was added to the residue. After standing 30 minutes at room temperature with occasional swirling, the mixture was extracted with chloroform. The chloroform extract was washed once with water and dried over calcium sulfate. Calcium sulfate was removed by filtration and chloroform was evaporated from the filtrate to give a dark, oily residue. This was distilled to give 5.5 g. of a yellow, oily distillate, bp. 54°–58° at 0.3 mm. Hg. The distillate was shown by nmr to be a mixture of o-toluidine and 2,1-benzisothiazole. Water (20 ml.) was added to the distillate and the mixture was acidified to about pH 4 with 50 percent aqueous hydrochloric acid, then extracted with chloroform. The chloroform extract was dried, filtered, and evaporated as before to give 3.7 g. (27.4 percent) 2,1-benzisothiazole as a light yellow oil. This structure was confirmed by its nmr spectrum.

EXAMPLE 2

Preparation of 7-chloro-2,1-benzisothiazole:

A. The experiment of Example 1, part C, was repeated exactly, except 18.8 g. (0.1 mole) 2-chloro-6-methyl-N-sulfinylaniline was used in place of 2-methyl-N-sulfinylaniline and the reaction mixture was heated at reflux temperature for 19 hours. A single distillation of the crude product obtained from the chloroform extract of the reaction mixture gave 14.7 g. (86.5 percent) 7-chloro-2,1-benzisothiazole, bp. 95° at 0.3 mm. Hg. The product crystallized in the distillation receiver. Its nmr spectrum showed it to be essentially pure, and it was therefore not treated with aqueous hydrochloric acid, re-extracted and re-distilled as described in Example 1, part C. After recrystallization from hexane, 7-chloro-2,1-benzisothiazole was obtained as colorless needles, mp. 52°–54°. This structure was confirmed by its nmr spectrum which showed a singlet absorption at 9.17 ppm. for the proton attached to the 3-position of the benzisothiazole ring, and a multiplet absorption spread between 7.53 and 6.73 ppm. for the benzenoid protons.

Analysis. - Calcd. for $C_7H_4ClNS$ (percent): C, 49.57; H, 2.38; Cl, 20.90; N, 8.26; S, 18.90. Found (percent): C, 49.39; H, 2.39; Cl, 20.98; N, 8.25; S, 18.96.

B. A mixture of 5.7 g. (0.04 mole) 2-chloro-6-methylaniline, 22.6 g. (0.16 mole) N-sulfinylmethanesulfonamide, 6.3 g. (0.08 mole) dry pyridine, and 70 ml. dry benzene was prepared and processed according to the procedure of Example 1(J), except the reaction mixture was heated at reflux temperature 64 hours, to give 5.7 g. (84.0 percent) 7-chloro-2,1-benzisothiazole, bp. 96° at 0.3 mm. Hg. The product solidified in the distillation receiver during distillation. Nmr showed it to be essentially pure; it was therefore not treated with aqueous hydrochloric acid as in Example 1. After recrystallization from hexane, 7-chloro-2,1-benzisothiazole was obtained as colorless needles, mp. 52°–54°. This structure was confirmed by its nmr spectrum.

C. A mixture of 14.1 g. (0.1 mole) 2-chloro-6-methylaniline, 65.1 g. (0.3 mole) N-sulfinyl-p-toluenesulfonamide, and 100 ml. xylene was heated at reflux temperature 16 hours, then allowed to stand at room temperature one hour while white solid p-toluenesulfonamide crystallized from solution. The p-toluenesulfonamide was identified by nmr and by its melting point 135–138°, which was undepressed when mixed with an authentic sample. The p-toluenesulfonamide was removed from the reaction mixture by suction filtration, washed with benzene and discarded. The benzene wash was combined with the xylene filtrate. Benzene and xylene were removed by evaporation on a rotatory evaporator. The residue was chilled in an ice bath, and to it was added 30 ml. concentrated hydrochloric acid. Sulfur dioxide evolved from the mixture and more p-toluenesulfonamide, contaminated with 2-chloro-6-methylaniline hydrochloride, precipitated. After five minutes, water (100 ml.) was added to the mixture, and the precipitate was removed by suction filtration. Both the filtrate and the precipitate were extracted with benzene, and the combined benzene extracts were dried over calcium sulfate. After removal of calcium sulfate by filtration and evaporation of benzene from the filtrate, the residue was distilled in vacuo to give 4.0 g. of a mixture of recovered 2-chloro-6-methylaniline and 7-chloro-2,1-benzisothiazole. This structure was confirmed by nmr.

EXAMPLE 3

Preparation of 6-nitro-2,1-benzisothiazole, 4-nitro-2,1-benzisothiazole, 4-amino-2,1-benzisothiazole:

A. A mixture of 6.1 g. (0.04 mole) 2-methyl-5-nitroaniline, 22.6 g. (0.16 mole) N-sulfinylmethanesulfonamide, 6.3 g. (0.08 mole) dry pyridine, and 70 ml. dry benzene was prepared and processed according to the procedure of Example 1 (J), except the reaction mixture was stirred magnetically and heated at reflux temperature 65 hours. After evaporation of chloroform from the chloroform extract of the reaction mixture, the product solidified to give 6.14 g. (85.3 percent) 6-nitro-2,1-benzisothiazole, shown by nmr to be essentially pure. It was therefore neither distilled nor treated with aqueous hydrochloric acid as in Example 1. After recrystallization from a mixture of benzene and hexane, the product melted at 148.5°–150.5°. This structure was confirmed by its nmr spectrum: in deuteriochloroform solution containing tetramethylsilane as an internal reference standard, the nmr spectrum shows a singlet absorption at 9.50 ppm. for the proton attached to the 3-position of the benzisothiazole ring, a singlet absorption at 8.80 ppm. for the 7-proton, and a "singlet" absorption at 8.00 ppm. for the 4- and 5-protons, which are apparently magnetically equivalent in deuteriochloroform solution. In a mixture of deuterated acetone and deuterated dimethyl sulfoxide, the nmr spectrum of 6-nitro-2,1-benzisothiazole shows a singlet absorption at 9.92 ppm. for the 3-proton, a singlet absorption at 8.60 ppm. for the 7-proton and two doublet absorptions (J=8.5), one centered at 8.15 ppm., the other centered at 7.90 ppm. for the 4- and 5-protons.

Analysis - Calcd. for $C_7H_4N_2O_2S$ (percent): C, 46.66; H, 2.24; N, 15.55; O, 17.76; S, 17.79. Found (percent): C, 46.54: H, 2,35; N, 15.52; O, 17.76; S, 17.75.

B. The experiment of Example 1, part C, was repeated exactly, except 19.8 g. (0.1 mole) 2-methyl-3-nitro-N-sulfinylaniline was used in place of 2-methyl-N-sulfinylaniline and the reaction mixture was heated at reflux temperature 16 hours. A single distillation of the crude product obtained from the chloroform extract of the reaction mixture gave 8.1 g. solid 4-nitro-2,1-benzisothiazole, bp. 109°–110° at 0.25 mm. Hg., which was shown by its nmr spectrum to be contaminated with 2-methyl-3-nitro-N-sulfinylaniline and 2-methyl-3-nitroaniline. The crude, solid distillate was placed in 50 ml. water and the mixture was acidified to pH 4 with 50 percent aqueous hydrochloric acid, then stirred and heated on a steam bath 10 minutes. The solid melted while being heated, but on cooling to room temperature, pure 4-nitro-2,1-benzisothiazole solidified. This was isolated by suction filtration, washed with water, and allowed to dry in air overnight to give 3.5 g. (19.4 percent) pure 4-nitro-2,1-benzisothiazole as yellow needles, mp. 101.5°–103.5° after recrystallization from hexane. This structure was confirmed by its nmr spectrum which showed a singlet absorption at 10.05 ppm. for the proton attached to the 3-position of the benzisothiazole ring, and two multiplet absorptions at 8.43–8.03 and 7.73–7.20 ppm. for the benzenoid protons.

Analysis. - Calcd. for $C_7H_4N_2O_2S$ (percent): C, 46.66; H, 2.24; N, 15.55; O, 17.76; S, 17.79. Found (percent): C, 46.39; H, 2.26; N, 15.70; O, 17.72; S, 17.87.

C. 4-Nitro-2,1-benzisothiazole (5 g.) was reduced in a boiling mixture of 1 ml. glacial acetic acid, 67 ml. water, and 7 g. iron powder to give 1.5 g. 4-amino-2,1-benzisothiazole as a yellow-green solid, mp. 141°–143° (dec.) after recrystallization from water. This structure was confirmed by nmr.

EXAMPLE 4

Preparation of 6-chloro-2,1-benzisothiazole:

The experiment of Example 1, part (C) was repeated exactly, except 18.8 g. (0.1 mole) 5-chloro-2-methyl-N-sulfinylaniline was used in place of 2-methyl-N-sulfinylaniline and the reaction mixture was heated at reflux temperature for 16 hours. The crude product (12.2 g.) distilled at 77° at 0.3 mm. Hg. After treatment with aqueous hydrochloric acid as in Example 3, there was obtained 9.1 g. (52.6 percent) pure 6-chloro-2,1-benzisthiazole as white needles, mp. 67°–69° after recrystallization from hexane. This structure was confirmed by its nmr spectrum which showed a singlet absorption at 9.10 ppm. for the proton attached to the 3-position of the benzisothiazole ring, a singlet absorption (showing meta splitting) at 7.77 ppm. for the 7-proton, a doublet absorption centered at 7.58 ppm. (J=9) for the 4-proton, and a doublet absorption (showing meta splitting) centered at 7.07 ppm. (J=9) for the 5-proton.

Analysis. - Calcd. for $C_7H_4ClNS$ (percent): C, 49.$\overline{\phantom{0}}$, H, 2.38; Cl, 20.90; N, 8.26; S, 18.90. Found (percent): C, 49.35; H, 2.47; Cl, 21.14; N, 8.35; S, 18.87.

EXAMPLE 5

Preparation of 7-methoxy-2,1-benzisothiazole and 7-hydroxy-2,1-benzisothiazole:

A. To a solution of 60.4 g. (0.33 mole) 2-methoxy-6-methyl-N-sulfinylaniline and 150 ml. dry benzene in a 1 liter single-neck round-bottom flask was added at room temperature a solution of 50.8 g. (0.36 mole) N-sulfinylmethanesulfonamide and 75 ml. dry benzene. The mixture was chilled in an ice bath while to it was added portionwise with swirling, a solution of 24.5 g. (0.31 mole) dry pyridine and 75 ml. dry benzene. A solid, crystalline material precipitated. The crystalline mass was broken up and the mixture was heated gently to boiling with constant swirling under a condenser fitted with a calcium sulfate drying tube until the solid dissolved (about 10 minutes). The mixture was then heated at reflux temperature 72 hours. After cooling, benzene and pyridine were removed from the mixture by evaporation on a rotatory evaporator and 300 ml. water was added to the residue. After standing at room temperature for 30 minutes with occasional swirling, the mixture was extracted with chloroform. The chloroform extract was washed once with water and dried over calcium sulfate. Calcium sulfate was removed by filtration and chloroform was removed from the filtrate by evaporation on a rotatory evaporator. The dark, oily residue was distilled in vacuo. After a small fore-cut, there was obtained 14.1 g. of 2-methoxy-6-methylaniline, bp. 62°–65° at 0.4–0.5 mm. Hg., containing by nmr a trace of 7-methoxy-2,1-benzisothiazole; 2.6 g. of an intermediate distillation fraction which was a mixture of 2-methoxy-6-methylaniline and 7-methoxy-2,1-benzisothiazole; and 21.3 g. (39.1 percent) of essentially pure 7-methoxy- 2,1-benzisothiazole as a yellow oil, bp. 88°–93° at 0.3 mm. Hg. This structure was confirmed by its nmr spectrum which showed a singlet absorption at 9.06 ppm. for the proton attached to the 3-position of the benzisothiazole ring, a multiplet absorption spread between 7.37 and 6.47 ppm. for the benzenoid protons, and a singlet absorption at 3.97 ppm. for the methoxy protons.

Analysis. - Calcd. for $C_8H_7NOS$ (percent): C, 58.16; H, 4.27; N, 8.48; S, 19.41. Found (percent): C, 58.05; H, 4.57; N, 8.59; S, 19.31.

B. 7-Methoxy-2,1-benzisothiazole hydrochloride (6.0 g.) was refluxed 22 hours in a solution of 16 g. boron tribromide and 160 ml. methylene chloride to give 3.78 g. pure, yellow, crystalline 7-hydroxy-2,1-benzisothiazole, mp. 99°–100.5° after recrystallization from hexane. This structure was confirmed by nmr.

EXAMPLE 6

Preparation of 3-methyl-2,1-benzisothiazole:

A. A mixture of 16.7 g. (0.1 mole) 2-ethyl-N-sulfinylaniline, 15.5 g. (0.11 mole) N-sulfinylmethanesulfonamide, 7.1 g. (0.09 mole) dry pyridine, and 100 ml. dry benzene was prepared according to the procedure of Example 5 and then stirred magnetically and heated at reflux temperature 44 hours under a condenser fitted with a calcium sulfate drying tube. Benzene and pyridine were removed from the reaction mixture by evaporation on a rotatory evaporator. Water (50 ml.) was added to the residue and the mixture was allowed to stand one hour at room temperature with occasional swirling. The mixture was then extracted with chloroform, and the chloroform extract was washed once with water and dried over calcium sulfate. Calcium sulfate was removed by filtration and chloroform was removed from the filtrate by evaporation on a rotatory evaporator. The black, oily residue was distilled to give a yellow oil. bp. 51°–75° at 0.35–0.8 mm. Hg., which was shown by nmr to be a mixture of 3-methyl-2,1-benzisothiazole and 2-ethylaniline. Water (30 ml.) was added to the distillate and the mixture was acidified to pH 4 with 50 percent aqueous hydrochloric acid, then extracted with chloroform. The chloroform extract was dried, filtered, and evaporated as before, and the residue re-distilled to give 3.9 g. (26.1 percent) of pure 3-methyl-2,1-benzisothiazole which solidified on standing, white crystals, mp. 55°–57° after recrystallization from pentane. This structure was confirmed by its nmr spectrum which showed a complex multiplet absorption spread between 7.87 and 6.93 ppm. for the benzenoid protons, and a singlet absorption at 2.75 ppm. for the methyl group protons.

Analysis. - Calcd. for $C_8H_7NS$ (percent): C, 64.40; H, 4,73; N, 9.39; S, 21.49. Found (percent): C, 64.22; H, 4.61; N, 9.42; S, 21.48.

B. The experiment of Example 3, part (A) was repeated exactly, except 4.8 g. (0.04 mole) 2-ethylaniline was used in place of 2-methyl-5-nitroaniline. Evaporation of chloroform from the chloroform extract of the reaction mixture gave a black oil, which was shown by nmr to be a mixture of 2-ethylaniline and 3-methyl-2,1-benzisothiazole. Water (20 ml.) was added to the crude product and the mixture was acidified to about pH 4 with 50 percent aqueous hydrochloric acid, then extracted with chloroform. The chloroform extract was dried over calcium sulfate. Calcium sulfate was removed by filtration, and chloroform evaporated from the filtrate. The oily residue was distilled to give 0.4 g. 3-methyl-2,1-benzisothiazole, bp. 95° at 2.5 mm. Hg. The product solidified in the distillation receiver, mp. 55°–57° after recrystallization from pentane. This structure was confirmed by its nmr spectrum.

EXAMPLE 7

Preparation of 5-methoxy-2,1-benzisothiazole and 5-hydroxy-2,1-benzisothiazole:

A. (1) A mixture of 20.0 g. (0.11 mole) 4-methoxy-2-methyl-N-sulfinylaniline, 22.6 g. (0.16 mole) N-sulfinylmethanesulfonamide, 7.9 g. (0.10 mole) dry pyridine, and 150 ml. dry benzene was prepared according to the procedure of Example 5 and then stirred and heated at reflux temperature 60 hours under a condenser fitted with a calcium sulfate drying tube. Benzene and pyridine were removed from the mixture by evaporation on a rotatory evaporator. Water (100 ml.) was added to the residue and the mixture was allowed to stand one hour at room temperature with occasional swirling. The mixture was then extracted with chloroform and the chloroform extract was washed once with water and dried over calcium sulfate. Calcium sulfate was removed by filtration and chloroform was removed from the filtrate by evaporation on a rotatory evaporator. The black, oily residue was distilled to give 14.0 g. (77 percent) of 5-methoxy-2,1-benzisothiazole as a yellow oil, bp. 91°–98° at 0.7–0.8 mm. Hg. Its nmr spectrum showed it to be essentially pure product, uncontaminated with starting materials. A second distillation of the product, bp. 92°–94° at 0.7 mm Hg. gave 5-methoxy-2,1-benzisothiazole as a yellow solid, mp. 51°–55°. This structure was confirmed by its nmr spectrum which showed a singlet absorption at 8.75 ppm. for the proton attached to the 3-position of the benzisothiazole ring, a doublet absorption centered at 7.65 ppm. (J=9) for the 7-proton, a doublet absorption (showing meta splitting) centered at 7.07 ppm. (J=9) for the 6-proton, a singlet absorption (showing meta splitting) at 6.76 ppm. for the 4-proton, and a singlet absorption at 3.70 ppm. for the methoxy protons.

Analysis. - Calcd. for $C_8H_7NOS$ (percent): C, 58.16; H, 4.27; N, 8.48; O, 9.68; S, 19.41. Found (percent): C, 58.37; H, 4.25; N, 8.47; O, 9.85; S, 19.35.

2. A mixture of 9.1 g. (0.05 mole) 4-methoxy-2-methyl-N-sulfinylaniline and 20.0 g. (0.1 mole) N-sulfinylbenzenesulfonamide was heated at 150°–160° for 30 minutes, cooled to room temperature, and diluted with about 50 ml. of water. The mixture was extracted with chloroform and the chloroform extract was dried over calcium sulfate. Calcium sulfate was removed by filtration and chloroform was evaporated from the filtrate to give an oily residue which was shown by nmr to be a mixture of 4-methoxy-N-sulfinylaniline and 5-methoxy-2,1-benzisothiazole.

3. The experiment of Example 3, part (A) was repeated exactly, except 6.7 g. (0.0406 mole) 41-methoxy-2-methylaniline was used in place of 2-methyl-5-nitroaniline to give, after distillation of the oily residue from the chloroform extract, 5.86 g. (87.5 percent) pale yellow 5-methoxy-2,1-benzisothiazole, bp. 94° at 0.3 mm. Hg. The product solidified in the distillation receiver, mp. 49°–52°. This structure was confirmed by its nmr spectrum.

B. 5-Methoxy-2,1-benzisothiazole (6.3 g.) was refluxed 17 hours in a solution of 28.5 g. boron tribromide and 180 ml. methylene chloride to give 5.2 g. of 5-hydroxy-2,1-benzisothiazole as a green solid, mp. 215°–216°. This structure was confirmed by nmr.

EXAMPLE 8

Preparation of 5-methyl-2,1-benzisothiazole:

The experiment of Example 1, part C, was repeated exactly, except 16.7 g. (0.1 mole) 2,4-dimethyl-N-sulfinylaniline was used in place of 2-methyl-N-sulfinylaniline, 7.1 g. (0.09 mole) pyridine was used instead of 7.9 g. pyridine, and the reaction mixture was heated at reflux temperature for 65 hours. A single distillation of the crude product obtained from the chloroform extract gave 13.2 g. of light yellow oil, bp. 67°–69° at 0.25 mm. Hg. This was shown by nmr to be mainly 5-methyl-2,1-benzisothiazole, contaminated with a small amount of 2,4-dimethylaniline. The product was purified by diluting it with 100 ml. water, acidifying this with 50 percent aqueous hydrochloric acid to pH 4 and extracting the acidic mixture with chloroform. After drying, filtering, and evaporating the chloroform extract, the resultant residue was redistilled to give 10.4 g. (69.7 percent) of pure 5-methyl-2,1-benzisothiazole as a light yellow oil, bp. 65°–67° at 0.24 mm. Hg. This structure was confirmed by its nmr spectrum which showed a singlet absorption at 8.87 ppm. for the proton attached to the 3-position of the benzisothiazole ring, a doublet absorption centered at 7.69 ppm. (J=9) for the 7-proton, a singlet absorption (showing meta splitting) centered at 7.33 ppm. for the 4-proton, a doublet absorption (showing meta splitting) centered at 7.13 ppm. (J=9) for the 6-proton, and a singlet absorption at 2.33 ppm. for the methyl group protons.

Analysis. - Calcd. for $C_8H_7NS$ (percent): C, 64.40; H, 4.73; N, 9.39; S, 21.49. Found (percent): C, 64.39; H, 4.91; N, 9.43; S, 21.30.

EXAMPLE 9

Preparation of 7-methyl-2,1-benzisothiazole and 7-bromomethyl-2,1-benzisothiazole:

A. The experiment of Examaple 8 was repeated exactly, except 16.7 g. (0.1 mole) 2,6-dimethyl-N-sulfinylaniline was used in place of 2,4-dimethyl-N-sulfinylaniline to give 13.0 g. (87.1 percent) of pure 7-methyl-2,1-benzisothiazole as a yellow oil, bp. 68°–69° at 0.5 mm. Hg. This structure was confirmed by its nmr spectrum which showed a singlet absorption at 8.98 ppm. for the proton attached to the 3-position of the benzisothiazole ring, a complex multiplet absorption spread between 7.63 and 6.87 ppm. for the benzenoid protons, and a single absorption at 2.67 ppm. for the methyl group protons.

Analysis. - Calcd. for $C_8H_7NS$ (percent): C, 64.40; H, 4.73; N, 9.39; S, 21.49. Found (percent): C, 64.43; H, 4.81; N, 9.21; S, 21.24.

B. 7-Methyl-2,1-benzisothiazole (3.95 g.) was refluxed 19 hours in a solution of 4.81 g. N-bromosuccinimide, 0.07 g. benzoyl peroxide and 50 ml. carbon tetrachloride to give 4.13 g. lachrymatory 7-bromomethyl-2,1-benzisothiazole, mp. 85°–89° after recrystallization from hexane. This structure was confirmed by nmr.

EXAMPLE 10

Preparation of 6-cyano-2,1-benzisothiazole:

A mixture of 10.0 g. (0.054 mole) 4-methyl-3-(N-sulfinylamino)benzonitrile, 7.8 g. (0.055 mole) N-sulfinylmethanesulfonamide, 4.0 g. (0.051 mole) dry pyridine and 90 ml. dry benzene was prepared according to the procedure of Example 5, then heated at reflux temperature 43 hours under a condenser fitted with a calcium sulfate drying tube. After removing benzene and pyridine by evaporation on a rotatory evaporator, the residue solidified. Water (70 ml.) was added and the residue was crushed and mixed well with the water. After 15 minutes at room temperature, the mixture was acidified to pH 4 with 50 percent aqueous hydrochloric acid and extracted with chloroform. The solid dissolved readily in the chloroform. The chloroform extract was washed once with water and dried over calcium sulfate. After removal of calcium sulfate by filtration, and evaporation of chloroform from the filtrate, the residue solidified to give 7.3 g. (84.5 percent) of tan solid 6-cyano-2,1-benzisothiazole, shown to be essentially pure by nmr. Two recrystallizations from heptane gave the product as a pink solid. A subsequent sublimation at 100° and 0.2 mm. Hg. then gave the product as fine yellow needles, mp. 109°–111°. This structure was confirmed by ir and nmr. The infrared spectrum showed a strong nitrile group stretching vibration absorption at 2235 $cm^{-1}$ (in chloroform solution). The nmr spectrum showed a singlet absorption at 9.40 ppm. for the 3-proton of the benzisothiazole ring, a singlet absorption at 8.27 ppm. for the 7-proton, and two doublet absorptions (J=9) centered at 7.92 and 7.35 ppm. for the 4- and 5-protons.

Analysis. - Calcd. for $C_8H_4N_2S$ (percent): C, 59.98; H, 2.52; N, 17.49; S, 20.01. Found (percent): C, 60.03; H, 2,54; N, 17.54; S, 19.97.

EXAMPLE 11

Preparation of 4-carbomethoxy-2,1-benzisothiazole, 4-carboxy-2,1-benzisothiazole and 2,1-benzisothiazole-4-carboxylic acid chloride.

A. A mixture of 24.4 g. (0.12 mole) methyl 2-methyl-3-sulfinylaminobenzoate, 18.3 g. (0.13 mole) N-sulfinylmethanesulfonamide, 9.5 g. (0.11 mole) dry pyridine, and 250 ml. dry benzene was prepared according to the procedure of Example 5, then stirred and heated at reflux temperature for 45 hours under a condenser fitted with a calcium sulfate drying tube. After removing benzene and pyridine by evaporation on a rotatory evaporator, water (50 ml.) was added to the residue. This was then acidified to pH 4 with 50 percent aqueous hydrochloric acid and extracted with chloroform. The chloroform extract was dried over calcium sulfate. Removal of the calcium sulfate by filtration and evaporation of chloroform from the filtrate gave light brown solid product. This was recrystallized from hexane to give 15.1 g. (65.1 percent) of pure 4-carbomethoxy-2,1-benzisothiazole as yellow needles, mp. 88°–89°. Reduction of the volume of hexane mother liquor gave 2.0 g. of solid material which contained by nmr about 1.0 g. methyl 2-methyl-3-sulfinylaminobenzoate and about 1.0 g. additional 4-carbomethoxy-2,1-benzisothiazole. This structure was confirmed by its nmr spectrum which showed a singlet absorption at 9.97 ppm. for the proton attached to the 3-position of the benzisothiazole ring, a doublet absorption centered at 8.03 ppm. (J=9) which by integration is actually two exactly superimposed doublets, one for the 5-proton and one for the 7-proton, two partially superimposed doublet absorptions centered at 7.48 ppm. (J=9) and 7.38 ppm. (J=9) for the 6-proton, and a singlet absorption at 3.97 ppm. for the carbomethoxy group protons.

Analysis. - Calcd. for $C_9H_7NO_2S$ (percent): C, 55.95; H, 3.65; N, 7.25; O, 16.56; S, 16.59. Found (percent): C, 55.90; H, 3.70; N, 7.24; O, 16.62; S, 16.50.

B. 4-Carbomethoxy-2,1-benzisothiazole (16 g.) was hydrolyzed in 100 ml. concentrated hydrochloric acid to give 13.6 g. 4-carboxy-2,1-benzisothiazole as a white solid, mp. 273°–275°.

C. A mixture of 13.1 g. 4-carboxy-2,1-benzisothiazole, 20 g. thionyl chloride, 1 ml. N,N-dimethylformamide, and 100 ml. chloroform was heated at reflux temperature for two hours and 20 minutes to give 2,1-benzisothiazole-4-carboxylic acid chloride. A portion of the acid chloride dissolved in dry benzene was converted with gaseous ammonia to 2,1-benzisothiazole-4-carboxamide, mp. 205°–208°.

EXAMPLE 12

Preparation of 6-t-butyl-2,1-benzisothiazole:

A mixture of 10.5 g. (0.05 mole) 2-methyl-5-t-butyl-N-sulfinylaniline, 7.47 g. (0.053 mole) N-sulfinylmethanesulfonamide, 4.0 g. (0.05 mole) dry pyridine, and 50 ml. dry benzene was prepared according to the procedure of Example 5, then stirred and heated at reflux temperature 44 hours under a condenser fitted with a calcium sulfate drying tube. Benzene and pyridine were then removed from the reaction mixture by evaporation on a rotatory evaporator, and 50 ml. water was added to the residue. After standing at room temperature for 20 minutes with occasional swirling, the mixture was extracted with chloroform, and the chloroform extract was washed once with water. After drying the chloroform extract over calcium sulfate, removing calcium sulfate by filtration, and evaporating chloroform from the filtrate, the residue was distilled to give 6.5 g. (68.0 percent) of 6-t-butyl-2,1-benzisothiazole as a yellow oil; bp. 80°–85° at 0.2 mm. Hg. This was shown by nmr to be essentially pure, but containing traces of impurities. After further purification by elution with hexane through a neutral alumina column, an analytical sample had bp. 82° at 0.35 mm. Hg. This structure was confirmed by its nmr spectrum which showed a singlet absorption at 9.10 ppm. for the proton attached to the 3-position of the benzisothiazole ring, a singlet absorption at 7.80 ppm. for the 7-proton which almost superimposes the down-field peak of a doublet absorption centered at 7.73 ppm. (J=9) for the 4-proton, a doublet absorption (showing meta splitting) at 7.36 ppm. (J=9) for the 5-proton, and a singlet absorption at 1.37 ppm. for the t-butyl protons.

Analysis. - Calcd. for $C_{11}H_{13}NS$ (percent): C, 69.07; H, 6.85; N, 7.32. Found (percent): C, 69.31; H, 7.13; N, 7.27.

EXAMPLE 13

Preparation of 3-methyl-7-ethyl-2,1-benzisothiazole:

A mixture of 19.5 g. (0.1 mole) 2,6-diethyl-N-sulfinylaniline, 16.4 g. (0.116 mole) N-sulfinylmethanesulfonamide, 7.1 g. (0.09 mole) dry pyridine, and 100 ml. dry benzene was prepared according to the procedure of Example 5, then stirred and heated at reflux temperature 108 hours under a condenser fitten with a calcium sulfate drying tube. Benzene and pyridine were removed from the mixture by evaporation on a rotatory evaporator, and 50 ml. water was added to the residue. After standing 30 minutes at room temperature with occasional swirling, the mixture was extracted with chloroform. The chloroform extract was dried over calcium sulfate, filtered, and chloroform was evaporated from the filtrate to give an oily residue. The residue was distilled to given an oil, bp. 106°–110° at 5.4 mm. Hg., which was shown by nmr to be a mixture of 2,6-diethyl-N-sulfinylaniline and 3-methyl-7-ethyl-2,1-benzisothiazole. Concentrated hydrochloric acid (30 ml.) was added to the distillate and the mixture was stirred at room temperature for 30 minutes. Solid hydrochloride salts were removed by suction filtration and discarded. (Nmr showed that the solids did not contain desired product.) The acidic filtrate was diluted with 40 ml. water and extracted with chloroform. The chloroform extract was washed once with water, then dried, filtered and evaporated as before. The oily residue, principally 3-methyl-7-ethyl-2,1-benzisothiazole, but still contaminated with a small amount of starting material, was then eluted with hexane through a column of neutral alumina to give 1.0 g. (5.6 percent) of pure 3-methyl-7-ethyl-2,1-benzisothiazole as a colorless liquid. The product was redistilled, bp. 90° at 1.5 mm. Hg. This structure was confirmed by its nmr spectrum which showed a complex multiplet absorption spread between 7.57 and 6.97 ppm. for the benzenoid protons, a singlet absorption at 2.8 ppm. for the methyl group attached to the 3-position of the benzisothiazole ring, and a quartet absorption centered at 3.15 ppm. and a triplet absorption centered at 1.38 ppm. for the 7-ethyl group.

EXAMPLE 14

Preparation of 3-phenyl-2,1-benzisothiazole:

A mixture of 25.8 g. (0.113 mole) 2-benzyl-N-sulfinylaniline, 18.3 g. (0.13 mole) N-sulfinylmethanesulfonamide, 7.9 g. (0.1 mole) dry pyridine, and 100 ml. dry benzene was prepared according to the procedure of Example 5, then stirred and heated at reflux temperature for three hours and 30 minutes under a condenser fitted with a calcium sulfate drying tube. At this point, so much black solid had collected that the magnetic stirrer was inoperable. Benzene and pyridine were removed from the mixture by evaporation on a rotatory evaporator, and the residue was heated on the rotatory evaporator at 80° for one additional hour while it effervesced. After cooling, 100 ml. water was added to the mixture and it was then heated on a steam bath 10 minutes, cooled and extracted with warm chloroform. The chloroform extract was washed once with water and dried over calcium sulfate. After filtration, evaporation of chloroform from the filtrate, and distillation of the residue, there was obtained 9.4 g. of a semisolid, bp. 122° at 0.7 mm. Hg. The distillate was boiled in hexane to separate 1.2 g. insoluble, colorless, crystalline methanesulfonamide. The hexane-soluble portion of the distillate was shown by nmr to be a mixture of 2-benzylaniline and 3-phenyl-2,1-benzisothiazole. This fraction was treated with 50 ml. aqueous hydrochloric acid, adjusted to pH 4, and extracted with chloroform. The chloroform extract was washed once with water, dried, filtered, and evaporated as before. The residue was eluted through a column of alumina with hexane, 20 percent benzene-hexane, 50 percent benzene-hexane, and benzene, consecutively. A small amount of an unidentified white solid was eluted from the column first, then 2.6 g. (10.9 percent) of pure 3-phenyl-2,1-benzisothiazole as a yellow oil.

17

Finally, 2-benzylaniline was eluted from the colume. The 3-phenyl-2,1-benzisothiazole was distilled, bp. 140°–141° at 0.35 mm. Hg. as a light yellow oil. This structure was confirmed by its nmr spectrum which showed only a complex multiplet absorption spread between 8.00 and 7.08 ppm. for the 3-phenyl protons and the benzenoid portons of the benzisothiazole ring.

Analysis - Calcd. for $C_{13}H_9NS$ (percent): C, 73.90; H, 4.29; N, 6.63; S, 15.17. Found (percent): C, 74.25; H, 4.26; N, 6.75; S, 15.08.

EXAMPLE 15

Preparation of 4-methoxy-2,1-benzisothiazole and 4-hydroxy-2,1-benzisothiazole.

A. (1) A mixture of 24.1 g. (0.1317 mole) 3-methoxy-2-methyl-N-sulfinylaniline, 22.6 g. (0.16 mole) N-sulfinylmethanesulfonamide, 9.5 g. (0.12 mole) dry pyridine, and 150 ml. dry benzene was prepared according to the procedure of Example 5, then stirred and heated at reflux temperature 60 hours under a reflux condenser fitted with a calcium sulfate drying tube. After removing benzene and pyridine by evaporation on a rotatory evaporator, 100 ml. water was added to the reaction mixture which was then allowed to stand one hour at room temperature with occasional swirling. The mixture was extracted with chloroform; the chloroform extract was washed once with water and dried over calcium sulfate. After removing calcium sulfate by filtration, and evaporating chloroform from the filtrate, the black, oily residue was distilled to give 10.1 g. of a mixture of 3-methoxy-2-methylaniline and 4-methoxy-2,1-benzisothiazole, boiling range 82°–93° at 0.8–1.0 mm. Hg. Water (50 ml.) was added to the distillate. To this was added 40 ml. 25 percent aqueous hydrochloric acid. A yellow precipitate appeared in the mixture. Additional water was added until the precipitate dissolved, and the mixture was extracted with ether. The ether extract was washed once with water, then dried, filtered, and evaporated as before to give 6.3 g. (29.0 percent) of pure 4-methoxy-2,1-benzisothiazole as a light yellow oil. This structure was confirmed by its nmr spectrum which showed a singlet absorption at 9.32 ppm. for the proton attached to the 3-position of the benzisothiazole ring, a multiplet absorption spread between 7.55 and 7.15 ppm. for the 6- and 7-protons, a doublet absorption (showing meta splitting) centered at 6.33 ppm. (J=6) for the 5-proton, and a singlet absorption at 3.90 ppm. for the methoxy protons.

Analysis. - Calcd. for $C_8H_7NOS$ (percent): C, 58.16; H, 4.27; N, 8.48; O, 9.68; S, 19.41. Found (percent): C, 58.07; H, 4.31; N, 8.59; O, 9.82; S, 19.06.

2. A mixture of 19.5 g. (0.142 mole) 3-methoxy-2-methylaniline, 80.1 g. (0.568 mole) N-sulfinylmethanesulfonamide, 22.5 g. (0.284 mole) dry pyridine, and 210 ml. dry benzene was prepared, refluxed 65 hours, and processed according to the procedure of Example 3(A). The crude, tarry residue obtained from the chloroform extract of the reaction mixture was distilled to give 4.2 g. (17.9 percent) 4-methoxy-2,1-benzisothiazole as a light yellow oil, bp. 91° at 0.45 mm. Hg. This structure was confirmed by its nmr spectrum.

B. A mixture of 6.3 g. 4-methoxy-2,1-benzisothiazole, 28.5 g. boron tribromide, and 180 ml. methylene chloride was heated at reflux temperature 17 hours to give 5.1 g. 4-hydroxy-2,1-benzisothiazole

18 as a yellow solid, mp. 184.5°–186.5° after recrystallization from benzene. This structure was confirmed by nmr.

EXAMPLE 16

Preparation of naphth[1,2-c]isothiazole

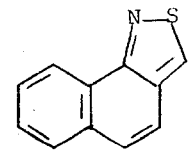

A. A mixture of 8.88 g. (0.046 mole) 2-methyl-1-sulfinylaminonaphthalene, 12.97 g. (0.092 mole) N-sulfinylmethanesulfonamide, 3.6 g. (0.046 mole) dry pyridine, and 50 ml. dry benzene was prepared according to the procedure of Example 5, then stirred and heated at reflux temperature 48 hours under a condenser fitted with a calcium sulfate drying tube. Benzene and pyridine were removed from the reaction mixture by evaporation on a rotatory evaporator and 50 ml. water was added to the residue. After standing 45 minutes at room temperature with occasional swirling, the mixture was acidified with 50 percent aqueous hydrochloric acid to pH 4 and extracted with chloroform. The chloroform extract was washed once with water and dried over calcium sulfate. After removing calcium sulfate by filtration and evaporating chloroform from the filtrate, there was obtained 7.7 g. of crude product which was shown by nmr to be contaminated with 2-methyl-1-sulfinylaminonaphthalene. The crude product was purified by eluting it through a column of basic alumina, first with hexane, then 50 percent benzenehexane, finally with benzene. 2-Methyl-1-sulfinylaminonaphthalene was eluted first from the column, then mixtures of this with product, and finally pure product, naphth[1,2-c]isothiazole. Impure fractions were re-chromatographed so that a total of 5.3 g. (62.3 percent) pure naphth[1,2-c]isothiazole was obtained as white needles, mp. 69°–71° after recrystallization from hexane. This structure was confirmed by its nmr spectrum which showed a singlet absorption at 8.90 ppm. for the proton attached to the 3-position of the naphth[1,2-c]isothiazole ring, and a complex multiplet absorption spread between 7.83 and 7.20 ppm. for the remaining protons.

Analysis. - Calcd. for $C_{11}H_7NS$ (percent): C, 71.32; H, 3.81; N, 7.56; S, 17.31. Found (percent): C, 71.27; H, 3.84; N, 7.50; S, 17.25.

B. The experiment of Example 3, part A, was repeated exactly except 6.3 g. (0.04 mole) 1-amino-2-methylnaphthalene was used in place of 2-methyl-5-nitroaniline and the reaction mixture was heated at reflux temperature 46 hours. Upon evaporation of chloroform from the chloroform extract of the reaction mixture, the black, oily residue solidified. This was shown by nmr to be almost pure naphth[1,2-c]isothiazole, contaminated with a small amount of reactants. The product was purified by elution through a column of alumina with hexane, then hexane-benzene mixtures as eluents. The eluted product was recrystallized from hexane to give 4.05 g. (54.7 percent naphth[1,2-c]isothiazole as white crystals, mp. 69°–71°. This structure was confirmed by its nmr spectrum.

EXAMPLE 17

Preparation of 5-chloro-2,1-benzisothiazole:

The experiment of Example 3, part (A) was repeated exactly, except 5.7 g. (0.04 mole) 4-chloro-2-methylaniline was used in place of 2-methyl-5-nitroaniline, to give 6.03 g. (88.9 percent) yellow-brown crude product, shown by nmr to be essentially pure 5-chloro-2,1-benzisothiazole, containing only a trace of reactants. A sample recrystallized from hexane as light yellow needles, mp. 70°–72°. This structure was confirmed by its nmr spectrum. In deuterated acetone solution, containing tetramethylsilane as an internal reference standard, the nmr spectrum shows a singlet absorption at 9.53 ppm. for the proton attached to the 3-position of the benzisothiazole ring, a doublet absorption centered at 7.80 ppm. (J=9) for the 7-proton, a singlet absorption at 7.92 ppm. for the 4-proton (almost superimposing the downfield leg of the 7-H doublet) and a doublet absorption (showing meta splitting) centered at 7.39 ppm. (J=9) for the 6-proton. In deuteriochloroform (TMS internal reference), the nmr spectrum shows a singlet absorption at 9.07 ppm. for the 3-proton, a doublet (J=9) centered at 7.79 ppm. for the 7-proton, a singlet absorption at 7.68 ppm. for the 4-proton (almost superimposing the upfield leg of the 7-H doublet), and a doublet absorption centered at 7.33 ppm. (J=9) for the 6-proton. 5-Chloro-2,1-benzisothiazole was also synthesized from 4-chloro-2-methylaniline and thionyl chloride by the method of Davis and White (J. Org. Chem., 34, 2985 (1969)) who report mp. 72° for this material. A mixed melting point of 5-chloro-2,1-benzisothiazole obtained as described above with that prepared by the method of David and White showed no depression. The nmr spectrum of 5-chloro-2,1-benzisothiazole prepared by the method of Davis and White was identical to that described above for the same material.

EXAMPLE 18

Preparation of sulfinylsulfonamides:

All sulfinylsulfonamides employed in the execution of the present invention were prepared according to the procedure of G. Kresze, et al (Angew Chem. Intern. Ed. Engl., 1, 89 (1962)) by refluxing a mixture of the sulfonamide, a slight excess of thionyl chloride, and dry benzene. In the case of the preparation of N-sulfinylmethanesulfonamide, however, I have found it unnecessary to reflux the reaction mixture several days as recommended by Kresze, et al. A reaction time of three to 17 hours is sufficient to obtain a good yield of N-sulfinylmethanesulfonamide. In a representative example, a mixture of 53.4 g. methanesulfonamide, 60 ml. thionyl chloride, and 90 ml. dry benzene was stirred magnetically and heated at reflux temperature 17 hours under a condenser fitted with a calcium sulfate drying tube. After cooling, benzene was removed from the mixture by evaporation on a rotatory evaporator and the residue was distilled to give 64.6 g. of N-sulfinylmethanesulfonamide as a yellow liquid, bp. 86°–88° at 0.75 mm. Hg. This material reacts violently with water, and care should be taken to protect it from atmospheric moisture which will rapidly hydrolyze it to methanesulfonamide. It may be safely stored under dry nitrogen at room temperature for several months in a closed glass container.

EXAMPLE 19

Preparation of 2-alkyl-N-sulfinylanilines:

These compounds were prepared according to the procedure of G. Kresze, et al. (Example 18) by refluxing a mixture of a 2-alkylaniline, a slight excess of thionyl chloride, and dry benzene for a period of time ranging from 30 minutes to 24 hours, then removing benzene from the mixture by evaporation, usually on a rotatory evaporator. Liquid products were distilled in vacuo, usually at 5 to 0.2 mm. Hg. Solid products were recrystallized from benzene or hexane.

EXAMPLE 20

Antibacterial activity of 2,1-benzisothiazole:

Standard Difco nutrient agar plates 90 mm. in diameter were prepared and inoculated with the test organism and a sterile 12.7 mm. diameter filter paper disk moistened with 2,1-benzisothiazole was placed in the center of the plate. After 48 hours, the zone of inhibition was measured. For each organism, three replicates were averaged. Results are as follows (zone of inhibition in mm. is enclosed in parentheses following the name of the test organism): *E. coli* (32), *S. aureus* (22), *B. thuriengensis* (80), *S. fradiae* (no growth on plate, i.e., complete inhibition), *C. mediolanum* (no growth on plate), *N. formica* (no growth on plate). When the tests were repeated, except the filter paper disk was moistened with 10 percent 2,1-benzisothiazole in ethanol, allowing the ethanol to evaporate before placing the disk on the agar plate, results were: *E. coli* (22), *S. aureus* (19), *B. thuriengensis* (30), *S. fradiae* (80) *C. mediolanum* (22), *N. formica* (32).

EXAMPLE 21

Antifungal activity of 2,1-benzisothiazole:

The test procedure described in Example 20 was repeated except Sabouraud dextrose agar was used in place of Difco nutrient agar. Both 2,1-benzisothiazole and a 10 percent solution of 2,1-benzisothiazole in ethanol completely inhibited growth of the folowing fungi: *C. blakesleeana*, *C. lunata*, *A. niger*, *P. citrinum*, and *R. stolonifer*. As in Example 20, ethanol was allowed to evaporate from the filter paper disk before placing it on the agar plate.

EXAMPLE 22

Antifungal activity of 4-nitro-2,1-benzisothiazole and 7-nitro-2,1-benzisothiazole:

The test chemicals were added to bottles containing modified potato-dextrose broth inoculated with *P. digitatum*. Results were determined two weeks after inoculation. Both 4-nitro- and 7-nitro-2,1-benzisothiazole gave complete control (no growth of fungus) at a concentration of 50 ppm.

EXAMPLE 23

Antifungal activity of 5-chloro-4-nitro-2,1-benzisothiazole:

5-Chloro-4-nitro-2,1-benzisothiazole was prepared by mono-nitration of 5-chloro-2,1-benzisothiazole and its structure was confirmed by nmr. The 5-chloro-2,1-benzisothiazole intermediate was prepared as described in Example 17. The antifungal activity of 5-chloro-4-nitro-2,1-benzisothiazole was tested exactly as described in Example 22. At concentrations of 50, 10, 3 and 1 ppm. this material gave complete control (no growth) of both P. digitatum and P. italicum.

EXAMPLE 24

Preparation of 2,1-benzisothiazol-4-yl N-methylcarbamate:

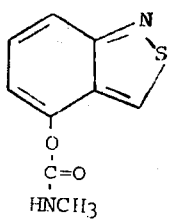

IV

A solution of 2.0 g. 4-hydroxy-2,1-benzisothiazole, 2.0 g. methylisocyanate, catalytic amounts of triethylenediamine and stannous octoate, and 25 ml. dry tetrahydrofuran was allowed to stand in a closed container overnight at room temperature, then heated under a condenser at reflux temperature one hour. Solvent and excess methylisocyanate were removed from the mixture by evaporation on a rotatory evaporator. The solid residue was washed with hot hexane and isolated by suction filtration to give 3.1 g. 2,1-benzisothiazol-4-yl N-methyl-carbamate, mp. 149°–152° after recrystallization from benzene. This structure was confirmed by nmr. Other mono- and di-N-lower alkylcarbamates can be made in the same manner from the corresponding mono- and di-hydroxy intermediate.

EXAMPLE 25

Insecticidal activity of 2,1-benzisothiazol-4-yl N-methylcarbamate.

A. Nasturtium plant growing in a five ounce "Dixie" cup were infested with bean aphids (Aphis fabae) and sprayed with 25 ml. of a solution containing water, small amounts of acetone and surfactant, and 500 ppm. 2,1-benzisothiazol-4-yl N-methylcarbamate. After 24 hours, the carbamate had destroyed 100 percent of the bean aphids.

B. Lima bean plants growing in a five ounce "Dixie" cup were infested with two spotted mites (Tetranychus urticae) and sprayed with 25 ml. of the solution described above. After 48 hours, only minor damage to the mites was evident.

C. Lima bean plant leaves, sprayed with 25 ml. of the solution described above were placed in a petri dish with five Mexican bean beetle larvae (Epilachna varivestus). After 48 hours the carbamate had destroyed 100 percent of the Mexican bean beetle larvae. An identical procedure was used against southern armyworm (Prodenia eridania), whereby three of five of the southern armyworms were destroyed.

D. The toxicity of 2,1-benzisothiazole-4-yl N-methylcarbamate to F-58-WT strain houseflies was determined by applying a one microliter dose of an acetone solution of the carbamate to each of 25 flies. At the same time, an identical procedure was used except the carbamate was replaced with the commercial insecticide, DDT. Results of this test are given in Table I.

Table I

| Concentration of active substances (%) | IV[a] | DDT |
|---|---|---|
| 1.0 | 88/100[b] | 88/92[b] |
| 0.5 | 92/96 | 92/100 |
| 0.25 | 76/84 | 68/84 |
| 0.125 | 60/72 | 56/64 |
| 0.06 | 32/40 | 24/44 |
| 0.03 | 32/32 | 0/32 |
| 0.015 | 16/12 | 0/24 |

[a]2,1-benzisothiazol-4-yl N-methylcarbamate.
[b]% knockdown of houseflies after 30 min./% kill after 24 hours.

EXAMPLE 26

Preparation and insecticidal activity of 2,1-benzisothiazol-7-yl N-methylcarbamate:

To a solution of 2.0 g. 7-hydroxy-2,1-benzisothiazole, 40 ml. dry benzene, and catalytic amounts of triethylenediamine and stannous octoate was added 2.5 g. methylisocyanate. After about five minutes at room temperature, yellow solid carbamate product crystallized from solution. The mixture was allowed to stand at room temperature overnight, then solvent and excess methylisocyanate were removed by evaporation on a rotatory evaporator. The solid residue was washed with hot hexane and isolated by suction filtration to give 2.6 g. yellow, microcrystalline 2,1-benzisothiazol-7-yl N-methylcarbamate, mp. 145°–148° (dec.) after recrystallization from benzene. This structure was confirmed by ir and nmr. The insecticidal activity of this material was determined exactly as described in Example 25, whereby 2,1-benzisothiazol-7-yl N-methylcarbamate (500 ppm. concentration) destroyed 100 percent of Mexican bean beetle larvae and bean aphids, four of five southern armyworms, and had no effect on two-spotted mites.

It is to be understood that the above disclosure is by way of specific example and that numerous modifications and variations are available to those of ordinary skill in the art without departing from the true spirit and scope of my invention.

I claim:

1. A method for preparing a 2,1-benzisothiazole having the formula

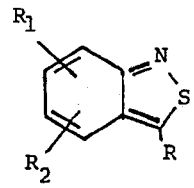

which comprises reacting a 2-alkylaniline or a 2-alkyl-N-sulfinylaniline having the formula

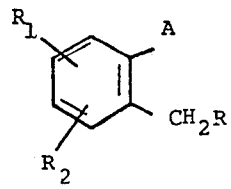

in which A is amino or N-sulfinylamino and R, $R_1$ and $R_2$ are independently hydrogen, alkyl having one to eight carbon atoms, phenyl or phenyl substituted with halogen or lower alkyl having one to four carbon atoms and $R_1$ and $R_2$ are additionally independently selected from halogen, nitro, alkoxy having one to eight carbon atoms, chlorocarbonyl, carboalkoxy having one to eight carbon atoms, or dialkylcarbamoyl having one to eight carbon atoms with a sulfinylsulfonamide having the general formula $R_3SO_2NSO$ in which $R_3$ is alkyl having one to 30 carbon atoms, optionally substituted with halogen, or phenyl, optionally substituted with halogen, alkyl having one to four carbon atoms or nitro at a temperature from about 50° to about 150° C.

2. A method for preparing a 2,1-benzisothiazole in accordance with claim 1 which comprises reacting a 2-alkylaniline free of acidic hydrogen with said sulfinylsulfonamide.

3. A method for preparing a 2,1-benzisothiazole in accordance with claim 1 which comprises reacting a 2-alkyl-N-sulfinylaniline free of acidic hydrogen with said sulfinylsulfonamide.

4. A method for preparing a 2,1-benzisothiazole in accordance with claim 1 in which R is alkyl having one to eight carbon atoms.

5. A method for preparing a 2,1-benzisothiazole in accordance with claim 1 in which R is alkyl having one to four carbon atoms.

6. A method for preparing a 2,1-benzisothiazole in accordance with claim 1 in which R is methyl.

7. A method for preparing a 2,1-benzisothiazole in accordance with claim 1 in which R is phenyl.

8. A method for preparing a 2,1-benzisothiazole in accordance with claim 1 in which R is tolyl.

9. A method for preparing a 2,1-benzisothiazole in accordance with claim 1 in which R and $R_1$ are hydrogen and $R_2$ is chlorine.

10. A method for preparing a 2,1-benzisothiazole in accordance with claim 1 in which R and $R_1$ are hydrogen and $R_2$ is nitro.

11. A method for preparing a 2,1-benzisothiazole in accordance with claim 1 in which R and $R_1$ are hydrogen and $R_2$ is lower alkoxy having one to four carbon atoms.

12. A method for preparing a 2,1-benzisothiazole in accordance with claim 1 in which R and $R_1$ are hydrogen and $R_2$ is lower alkyl having one to four carbon atoms.

13. A method for preparing a 2,1-benzisothiazole in accordance with claim 1 in which R is hydrogen, $R_1$ is chlorine and $R_2$ is nitro.

* * * * *